(12) United States Patent
Park

(10) Patent No.: US 7,525,632 B2
(45) Date of Patent: Apr. 28, 2009

(54) LIQUID CRYSTAL DISPLAY WITH TEMPERATURE OPTIMIZED LIQUID CRYSTAL PROPERTIES

(75) Inventor: Su Hyun Park, Kyonggi-do (KR)

(73) Assignee: LG Display Co., Ltd., Seoul (KR)

( * ) Notice: Subject to any disclaimer, the term of this patent is extended or adjusted under 35 U.S.C. 154(b) by 57 days.

(21) Appl. No.: 11/020,195

(22) Filed: Dec. 27, 2004

(65) Prior Publication Data

US 2005/0140919 A1    Jun. 30, 2005

(30) Foreign Application Priority Data

Dec. 30, 2003   (KR) .................. 10-2003-0101006

(51) Int. Cl.
*C09K 19/02*    (2006.01)
(52) U.S. Cl. ..................................... 349/181
(58) Field of Classification Search ................. 349/181

See application file for complete search history.

(56) References Cited

U.S. PATENT DOCUMENTS

| | | | | |
|---|---|---|---|---|
| 5,126,868 | A  * | 6/1992 | Kizaki et al. .................. | 349/76 |
| 6,791,640 | B1 * | 9/2004 | Okamoto et al. ........... | 349/113 |
| 6,885,412 | B2 * | 4/2005 | Ohnishi et al. ................ | 349/72 |
| 6,930,667 | B1 * | 8/2005 | Iijima et al. .................. | 345/101 |
| 6,987,547 | B2 * | 1/2006 | Yang et al. .................... | 349/69 |

* cited by examiner

*Primary Examiner*—David Nelms
*Assistant Examiner*—Nathanael R Briggs
(74) *Attorney, Agent, or Firm*—McKenna Long & Aldridge LLP

(57) ABSTRACT

A liquid crystal display (LCD) device includes an LCD panel provided with two substrates and a liquid crystal layer formed between the two substrates to display an image, and a backlight formed on a rear surface of the LCD panel to provide light, wherein the properties of liquid crystal in the liquid crystal layer are optimized for a driving temperature of the LCD panel between about 30° C. and about 70° C.

3 Claims, 4 Drawing Sheets

LIQUID CRYSTAL DISPLAY WITH TEMPERATURE OPTIMIZED LIQUID CRYSTAL PROPERTIES

This present invention claims the benefit of Korean Application No. P2003-101006, filed in Korea on Dec. 30, 2003, which is hereby incorporated by reference.

BACKGROUND OF THE INVENTION

1. Field of the Invention

The present invention relates to a flat display device, and more particularly, to a liquid crystal display (LCD) device. Although the present invention is suitable for a wide scope of applications, it is particularly suitable for improving efficiency of an LCD panel by optimizing the properties of liquid crystal according to a temperature.

2. Discussion of the Related Art

Recently, flat display devices such as a liquid crystal display (LCD) device, a filled emission display (FED) device, an electro-luminescence display (ELD) device and a plasma display panel (PDP) have been actively researched and developed. Among these flat display devices, the LCD device has attracted great attentions. The LCD device includes liquid crystal having both fluidity of liquid and optical property of crystal, such that the LCD device applies an electric field to the liquid crystal to change an optical anisotropy. Also, the LCD device has thin profile and low power consumption, and therefore, is widely used for vehicles and color televisions as well as lap top computers, PDAs and the like.

In general, the LCD device includes an upper substrate for a color filter and a lower substrate for a thin film transistor array. The upper and lower substrates face each other and sandwich a liquid crystal layer that has a dielectric anisotropy. Moreover, the thin film transistor array has a plurality of thin film transistors formed in hundreds of thousands of pixels and switched on/off by pixel-select address lines. Thus, a voltage is applied to a corresponding pixel, and is maintained to a next address by a capacitor.

Hereinafter, an LCD device in a related art will be described with reference to the accompanying drawings. FIG. 1 is a cross-sectional view illustrating the LCD device in the related art. As shown in FIG. 1, the LCD device is provided with an LCD panel 8, a backlight 9 that provides light to the LCD panel 8, a case (not shown) that accommodates the backlight 9 and supports the LCD panel 8 and the backlight 9, and a bezel part of a stainless steel material that surrounds an edge except an effect area of displaying an image. The bezel part is fixed to an outside of the case. Herein, the LCD panel 8 includes a liquid crystal layer 5 having a dielectric anisotropy, upper and lower substrates 1 and 2, and polarizing layers 6 disposed on outer surfaces of the upper and lower substrates 1 and 2 to selectively transmit light in a specific direction. In the LCD device, it is possible to control the amount of light generated in the backlight 9 according to the alignment state of the liquid crystal layer 5 and the position of polarizing axis of the polarizing layer 6, thereby realizing a gray scale.

Although not shown, the upper substrate 1 of the LCD device includes R(red)/G(green)/B(blue) color filters arranged in order to display colors, a black matrix layer for dividing R/G/B cells and shielding the light, and a common electrode for applying the voltage to liquid crystal cells. On the other hand, the lower substrate 2 of the LCD device further includes a plurality of gate and data lines crossing each other to define pixel regions, a plurality of thin film transistors T formed at crossing points of the gate and data lines to control turning-on/off of voltage, and a pixel electrode connected with the thin film transistor T to apply the voltage to the liquid crystal layer.

In case of an IPS (in-plane switching) mode LCD device, the common electrode is formed to be parallel with the pixel electrode on the lower substrate 2, thereby generating an IPS mode electric field that is parallel with the two substrates 1 and 2. Moreover, alignment layers may be formed on inner surfaces of the upper and lower substrates 1 and 2 having the aforementioned various patterns, thereby initially aligning liquid crystal molecules of the liquid crystal layer 5 at a desired direction. Meanwhile, the liquid crystal layer 5 may be formed of a high molecular material, in which the alignment of the liquid crystal molecules of the liquid crystal layer 5 can be easily changed by an external electromagnetic field, heat, and external stress such as adsorption of matters. That is, the optical properties of the liquid crystal layer 5 vary with the application of the voltage.

The LCD panel does not emit light by itself, and thus requires an additional light source for emitting the light. Especially, in case of a transmitting type LCD device, it is necessary to provide the backlight on a rear surface of the LCD panel. However, recently, a direct type LCD device with a big size LCD panel has become popular, and this brings about the increase of the number of backlights. As a result, a surface temperature of the LCD panel increases undesirably.

FIG. 2 is a graph illustrating $\Delta n$ of liquid crystal according to a temperature of the LCD device. FIG. 3 is a graph illustrating $\Delta \in$ of liquid crystal according to a temperature of the LCD device. When the temperature of the LCD panel increases, a refractive anisotropy ($\Delta n$) value and a dielectric anisotropy ($\Delta \in$) value of the liquid crystal decrease together, thereby reducing a luminance and a contrast ratio (C/R) of the LCD panel. Further, since a threshold voltage ($V_{th}$) is in inverse proportion to the dielectric anisotropy, the threshold voltage is also changed. Herein, the threshold voltage ($V_{th}$) indicates a driving voltage of the LCD device when a transmittance is at 10%. That is, on the assumption that an initial temperature of the LCD panel is at 20° C., the LCD panel is driven so that the temperature of the LCD panel is increased to 60° C. due to the heat of the backlight. In the related art, the properties of liquid crystal are controlled in correspondence to the temperature of about 20° C. Accordingly, when the temperature of the LCD panel is increased to 60° C., the refractive anisotropy ($\Delta n$) value and the dielectric anisotropy ($\Delta \in$) value decrease as shown in FIGS. 2 and 3.

For example, in a case where liquid crystal is applied to the IPS mode LCD device, the properties of liquid crystal are largely affected by the temperature. As shown in FIG. 2, the refractive anisotropy value is '0.0779' at the temperature of about 20° C., but becomes '0.0581' at the temperature of about 60° C. On the other hand, as shown in FIG. 3, the dielectric anisotropy value is '7' at the temperature of about 20° C., but becomes '4.1' at the temperature of about 60° C. Thus, the temperature properties of the LCD panel greatly affect the refractive anisotropy and the dielectric anisotropy.

FIG. 4 is a graph illustrating how the luminance and the temperature of the LCD panel change with the elapse of time. As shown in FIG. 4, when the time passes away, the surface temperature of the LCD panel increases to about 45° C. whereas the luminance of the LCD panel decreases sharply because the properties of the liquid crystal are changed. In addition, when the luminance is decreased at a predetermined white voltage ($V_{max}$), the contrast ratio also decreases.

FIG. 5 is a graph illustrating a relative transmittance according to temperatures of the LCD device, as well as simulation results of transmittance in due consideration of the properties of liquid crystal at the temperatures of 20° C. and 60° C. As shown in FIG. 5, when a retardation (Δnd) of the liquid crystal decreases, $V_{max}$ (voltage corresponding to $V_{on}$) and $V_{th}$ (voltage corresponding to $V_{off}$) are shifted in an increased direction. Also, the picture quality of the LCD panel deteriorates due to image sticking and cross talk generated by the change of transmittance according to the temperature. Due to the temperature increase of the LCD panel, the properties of liquid crystal are changed, thereby sharply decreasing the dielectric anisotropy and the refractive anisotropy. As a result, the picture quality deteriorates due to the decrease of luminance and contrast ratio C/R, the shift of the threshold voltage, and the image sticking.

SUMMARY OF THE INVENTION

Accordingly, the present invention is directed to a liquid crystal display (LCD) device that substantially obviates one or more problems due to limitations and disadvantages of the related art.

An object of the present invention is to provide an LCD device that is capable of improving an efficiency of an LCD panel by optimizing the properties of liquid crystal according to a temperature, thereby preventing the deterioration of picture quality.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an LCD device includes an LCD panel includes two substrates and a liquid crystal layer formed between the two substrates to display an image, and a backlight formed on a rear surface of the LCD panel to provide light, wherein the properties of liquid crystal in the liquid crystal layer are optimized for a driving temperature of the LCD panel between about 30° C. and about 70° C.

To optimize the property of liquid crystal for the substantial driving temperature of the LCD panel between about 30° C. and about 70° C., there is requirement for providing the liquid crystal having Δnd between about 275 nm and about 340 nm, having a ratio of a refractive anisotropy Δn at the temperature of about 20° C. to a refractive anisotropy Δn at the substantial driving temperature of the LCD panel ($\Delta n_{(20° C.)}/\Delta n_{(driving\ temperature\ T)}$) within a range of about 0.9 and about 1, having a ratio of a dielectric anisotropy ΔE at the temperature of about 20° C. to a dielectric anisotropy ΔE at the driving temperature T of the LCD panel ($\Delta E_{(20° C.)}/\Delta E_{(driving\ temperature\ T)}$) within a range of about 0.8 and about 1, and having Tni above 85° C.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Hereinafter, an LCD device according to an exemplary embodiment of the present invention will be described in detail. In the related art, the properties of liquid crystal are optimized on the basis of data for the properties at a temperature of about 20° C. Unlike the related art, in the exemplary embodiment of the present invention, the properties of liquid crystal are optimized in due consideration of the properties of a driving temperature of an LCD panel.

Accordingly, by substantially driving the LCD device, it is necessary to measure a correct temperature in the liquid crystal of the LCD panel. The driving temperature of the LCD panel may be varied according to the size of the LCD panel as well as the kinds and the number of backlights for the LCD panel. In general, the driving temperature of the LCD panel may be determined at a range of about 30° C. and about 70° C. As a result, the properties of liquid crystal are controlled for being optimized at a temperature between about 30° C. and about 70° C. For that, a retardation value for maximizing a transmittance is determined. The transmittance T for an IPS mode LCD device is usually in proportion to $\sin^2(2\Theta) \sin^2(\pi\Delta nd/\lambda)$. Herein, the first minimum condition for maximizing the transmittance is to obtain Δnd of 275 nm, wherein 'Δn' denotes a refractive anisotropy and 'd' denotes a cell gap.

When a voltage is applied to an LCD device including an alignment layer provided on respective inner surfaces of lower and upper substrates, directors of liquid crystal provided near to the alignment layers are not moved due to direct reactivity of the alignment layer, so that there is requirement for compensating Δnd in due consideration of the decrease in an effective cell gap 'd'. That is, Δnd may be determined at about 300 nm larger at about 10%, Δnd of the liquid crystal in the driving temperature of the LCD panel may be about 300 nm, and the retardation value of the liquid crystal at the driving temperature T of the LCD panel may be between about 275 nm and about 340 nm.

When the temperature of the LCD panel reaches is saturated with the driving temperature, the retardation value of the liquid crystal may be provided to have the value (between about 275 nm and about 340 nm) around the first minimum. However, under the low temperature of the LCD panel before the saturation, it may cause the deterioration of picture quality in the LCD panel due to the decrease of luminance. Accordingly, the liquid crystal have less temperature dependency of $\Delta n$ may be applied.

Figure 1:
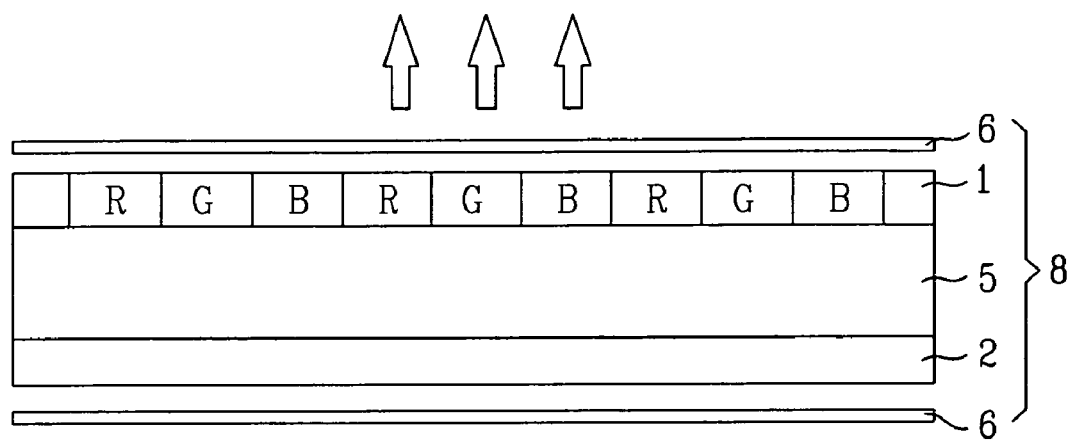
FIG. 1 is a cross-sectional view schematically showing a liquid crystal display (LCD) device according to a related art.
Figure 1:
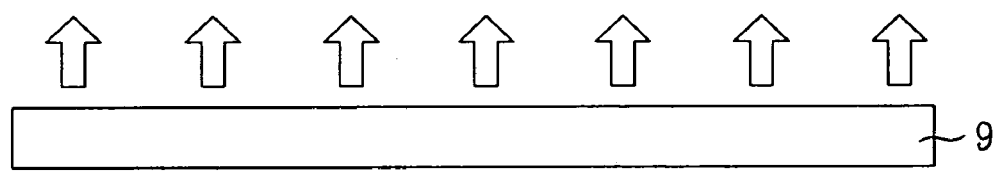
Figure 2:
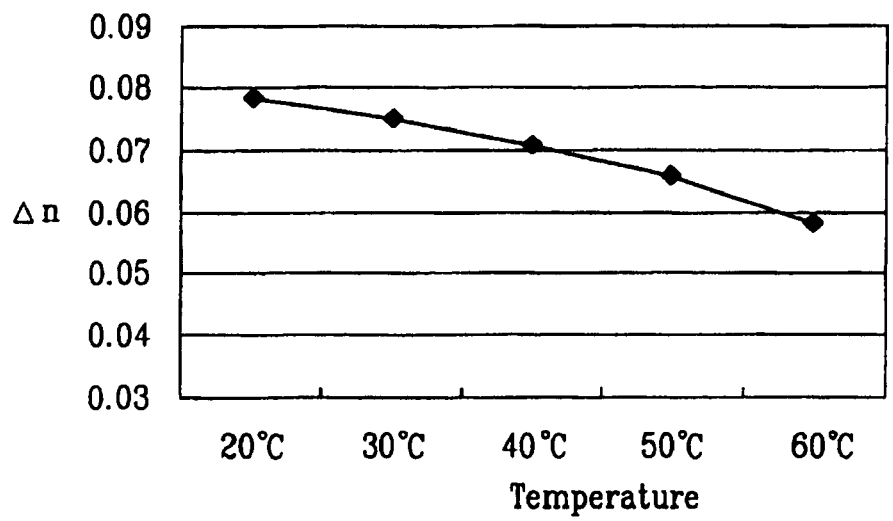
FIG. 2 is a graph illustrating Δn of liquid crystal according to a temperature of the LCD device according to the related art.

As shown in FIG. 2, the liquid crystal having less change of $\Delta n$ dependent on the temperature change may be more preferable compared to the liquid crystal having large change of $\Delta n$ dependent on the temperature change. A ratio of $\Delta n$ at the temperature of about 20° C. to $\Delta n$ at the substantial driving temperature T of the LCD panel ($\Delta n_{(20° C.)}/\Delta n_{(driving\ temperature\ T)}$) may be in a range of about 0.9 and about 1. Herein, by increasing $\Delta n$ (refractive anisotropy) of the liquid crystal, the black property generates at a low voltage. However, in this exemplary embodiment, a voltage range ($\Delta V$) of displaying a gray is largely decreased so that a gray inversion generates due to an output deviation of IC. Accordingly, a contrast ratio is decreased if the voltage is lowered below a predetermined value, so that the refractive anisotropy value is appropriately determined within the predetermined range.

Meanwhile, when the liquid crystal has a high transition temperature Tni of aligning in an isotropic state by nematic, it is referred to as a wide range temperature liquid crystal. For example, when Tni is high, the temperature dependency of $\Delta n$ is low and a nematic phase is formed in a wide temperature range. In the exemplary embodiment, Tni of the liquid crystal may be above 100° C., at least above 85° C. Also, $\Delta \in$ (dielectric anisotropy) of liquid crystal is smaller when the temperature is higher. For this reason, it is necessary to apply the dielectric value in due consideration of the substantial driving temperature of the LCD panel. Accordingly, in the driving temperature (about 30° C.<T<about 70° C.) of the LCD panel, the dielectric value may be above 7. Specifically, a ratio of $\Delta \in$ at the temperature of about 20° C. to $\Delta \in$ at the driving temperature T of the LCD panel ($\Delta \in_{(20° C.)}/\Delta \in_{(driving\ temperature\ T)}$) may be in a range of about 0.8 and about 1.

In case of the excessively large dielectric anisotropy $\Delta \in$, the polarity of liquid crystal increases, and the luminance decreases due to particles or electrons of peripheral materials such as sealant, hardener for injection inlet and alignment layer, thereby reducing a response speed. Also, a voltage holding ratio (VHR) is lowered until a signal of a next frame is received, so that an image sticking may be generated due to a high direct current. Thus, the dielectric anisotropy value is appropriately selected within the predetermined range.

Figure 3:
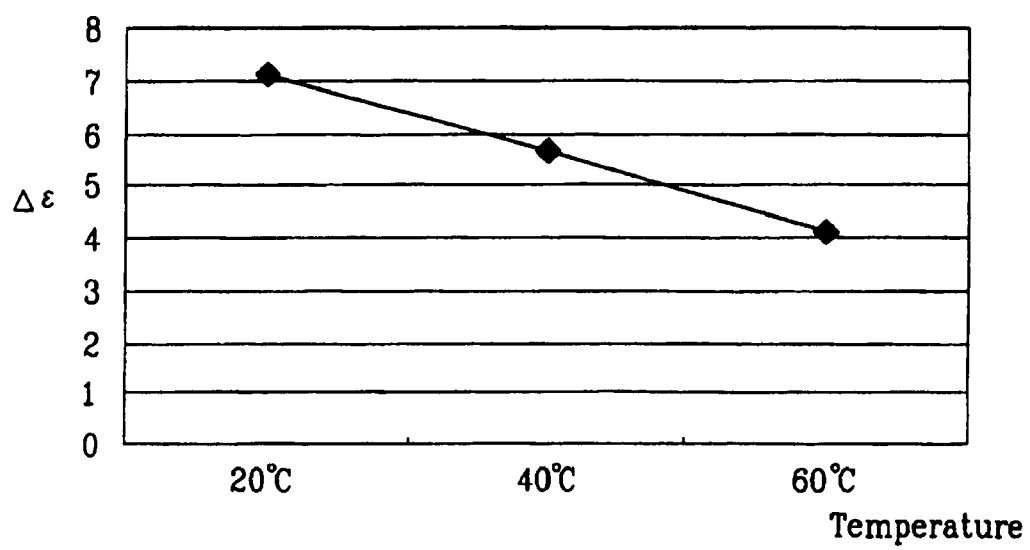
FIG. 3 is a graph illustrating ΔE of liquid crystal according to a temperature of the LCD device according to the related art.
Figure 4:
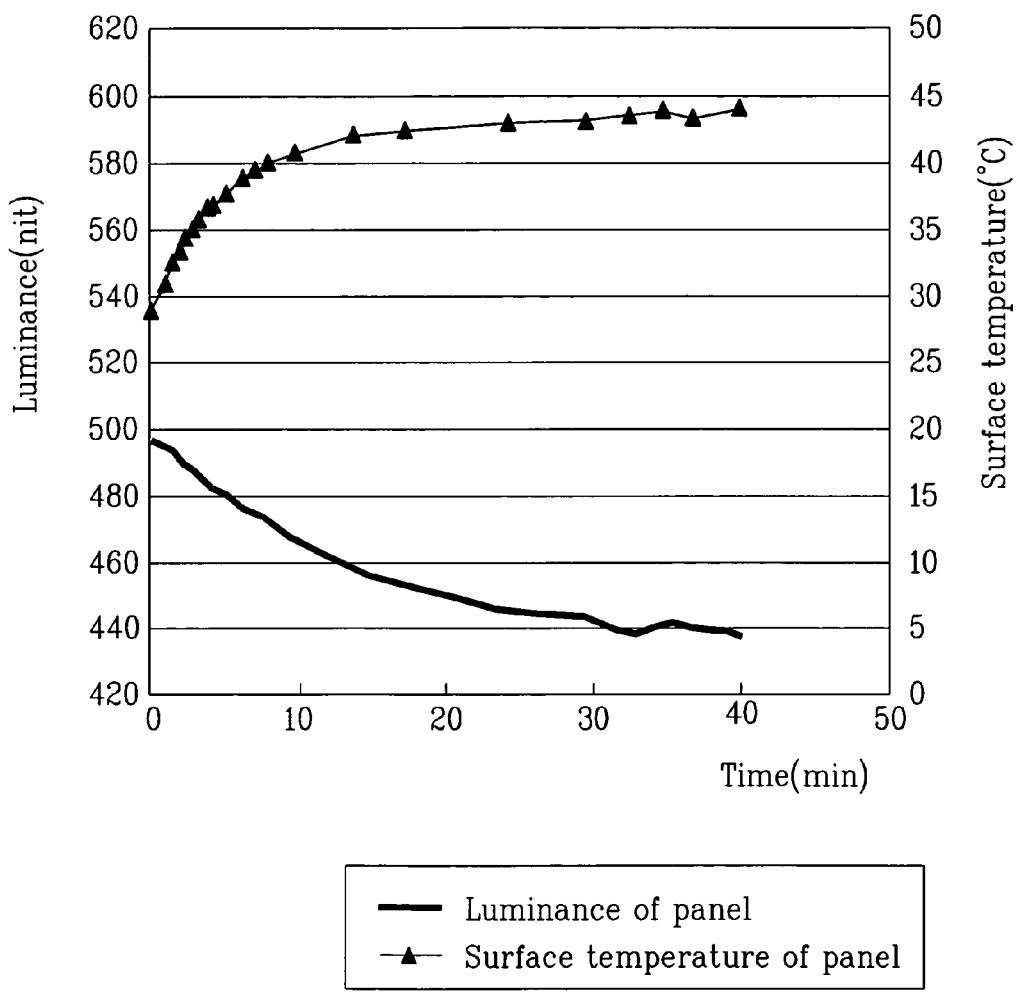
FIG. 4 is a graph illustrating how a luminance and a temperature of the LCD panel change with the elapse of time.
Figure 5:
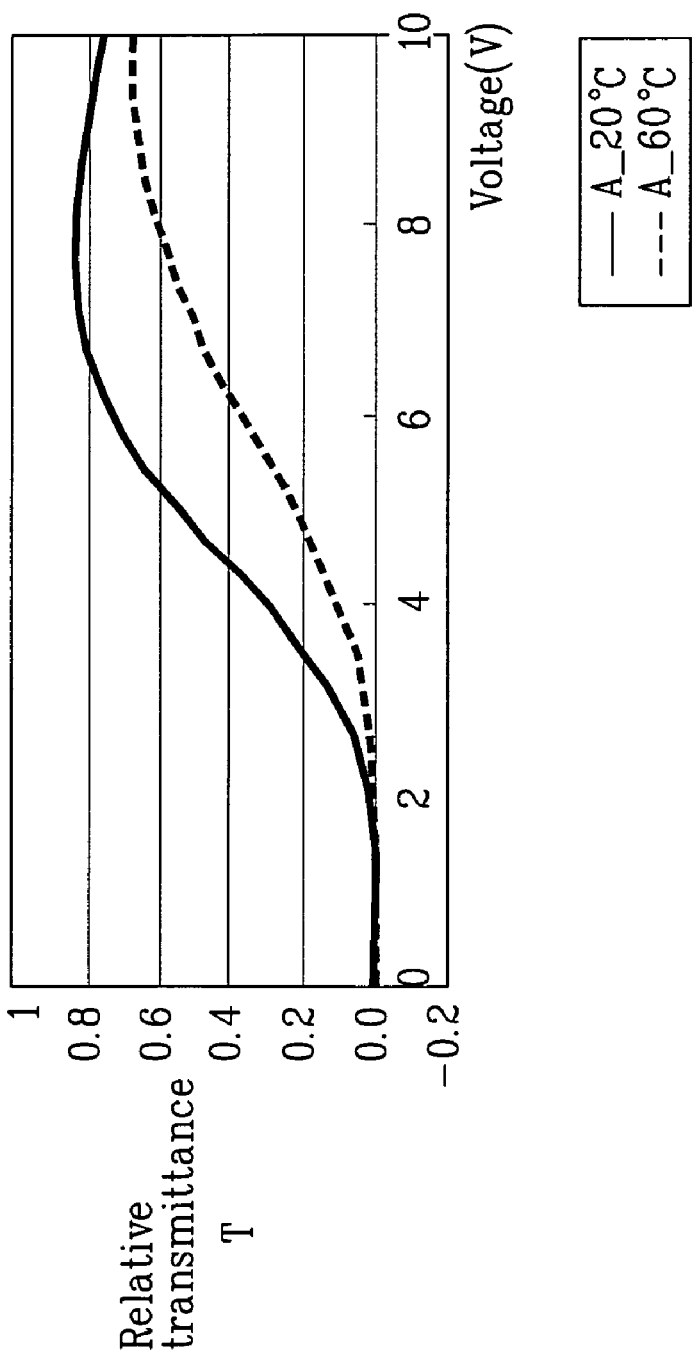
FIG. 5 is a graph illustrating a relative transmittance according to a temperature of the LCD device.

As shown in FIG. 3, the liquid crystal having less change of $\Delta \in$ dependent on the temperature change is more preferable compared to the liquid crystal having large change of $\Delta \in$ dependent on the temperature change. In this case, the liquid crystal may be provided to have less change of dielectric anisotropy dependent on the temperature change, which is suitable for the case of providing the LCD panel at the low temperature before saturation, as well as the case of saturating the temperature of the LCD panel with the driving temperature. Finally, a gamma value, $V_{max}$ suitable for the substantial driving temperature of the LCD panel is set based on the driving condition. At this time, the relation between the voltage and the transmittance (or reflectivity) on applying the voltage to the liquid crystal is referred to as the gamma property, wherein the gamma value indicates a degree of dividing the gray of graph.

As described above, the LCD device according to the exemplary embodiment of the present invention has the following advantages. The properties of liquid crystal are optimized according to the substantial driving temperature of the LCD panel, so that it is possible to prevent the deterioration of picture quality. In other words, it is possible to minimize the change on the properties of liquid crystal such as the dielectric anisotropy and the refractive anisotropy, thereby preventing the deterioration of picture quality generated by the decrease of luminance and contrast ratio, $V_{th}$ shift, and the image sticking. Further, by minimizing the change in the properties of liquid crystal to the temperature of the LCD panel, it is possible to obtain the large-sized LCD panel and easily determine the kinds and number of backlights.

It will be apparent to those skilled in the art that various modifications and variations can be made in the liquid crystal display device of the present invention without departing from the spirit or scope of the inventions. Thus, it is intended that the present invention cover the modifications and variations of this invention provided they come within the scope of the appended claims and their equivalents.

What is claimed is:

1. A liquid crystal display (LCD) device comprising:
an LCD panel including two substrates and a liquid crystal layer formed between the two substrates to display an image, and
a backlight formed on a rear surface of the LCD panel to provide light,
wherein the liquid crystal layer includes liquid crystal properties that are optimized for a driving temperature of the LCD panel between about 30° C. and about 70° C.; and
wherein the liquid crystal layer includes a multiplication ($\Delta nd$) of a cell gap (d) and a refractive anisotropy ($\Delta n$) that are determined in a range of between 300 nm and 340 nm at the driving temperature, and
wherein the liquid crystal layer includes a ratio of a refractive anisotropy $\Delta n$ at a temperature of 20° C. to a refractive anisotropy $\Delta n$ at a substantial driving temperature of the LCD panel ($\Delta n_{(20° C.)}/\Delta n_{(driving\ temperature\ T)}$) within a range of 0.9 and 1.

2. The LCD device of claim 1, wherein the liquid crystal layer includes a transition temperature Tni of above 85° C., for aligning in an isotropic state by nematic.

3. The LCD device of claim 1, wherein the liquid crystal layer includes a ratio of a dielectric anisotropy $\Delta \in$ at a temperature of 20° C. to a dielectric anisotropy $\Delta \in$ at a driving temperature T of the LCD panel ($\Delta \in_{(20° C.)}/\Delta \in_{(driving\ temperature\ T)}$) within a range of 0.8 and 1.

* * * * *